UNITED STATES PATENT OFFICE.

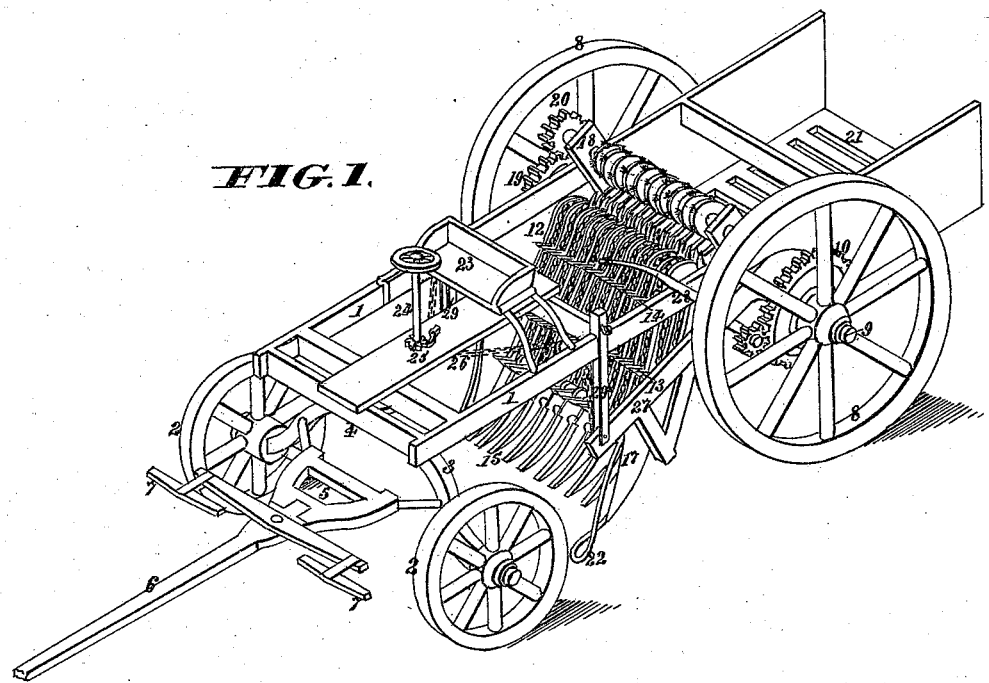

ALEXANDER L. HILL, OF LINCOLN COUNTY, ARKANSAS, AND GEORGE W. PAYNE, OF MEMPHIS, TENNESSEE.

IMPROVEMENT IN COTTON-HARVESTERS.

Specification forming part of Letters Patent No. 174,243, dated February 29, 1876; application filed August 4, 1875.

*To all whom it may concern:*

Be it known that we, ALEXANDER LAWS HILL, of Lincoln county, State of Arkansas, and GEORGE WASHINGTON PAYNE, of the city of Memphis, Shelby county, State of Tennessee, have invented a certain Cotton-Harvester for the harvesting or gathering of the cotton from the stalk, of which the following is a specification:

Our invention relates to certain improvements in that class of cotton-harvesters which are adapted to gather the cotton direct from the stalks while in the field.

Motion is imparted to the drum by means of a cogged driver and pinion attached to the axle of the driving-wheels. On the surface of this drum are equally-spaced pins for giving motion to a series of endless chains or bands, having claws for gathering the cotton-bolls and carrying them upward until brought in contact with a brush, which, revolving in a direction contrary to that of the chains, sweeps them into a box at the rear of the machine. The chains or bands revolve between the teeth of the comb and over the apron and cylinder, being held in proper position by means of suitable guide-rods. Projecting wings inclose the apron and comb for the purpose of securing the cotton-bolls in position for being acted upon by the chains. Attached to the wings, and in advance of the points of the comb on each side, is a divider for bringing the stalks into position to be acted upon by the comb.

In the accompanying drawings, Figure 1 is a perspective view of the machine. Fig. 2 is a longitudinal section of same.

The invention consists of a frame, 1 1 1 1, supported on four wheels—the fore wheels 2 supported by a curved axle, 3, revolving on a fifth-wheel, 4, as is usual in coach or carriage building. Attached to this axle are the hounds 5, the tongue 6, the single and double whiffletrees 7. To the rear of this frame or bed are a large pair of wheels, being the hind wheels 8 8, and constituting the driving-wheels of the machinery for gathering the cotton. These wheels are fixed on the axle 9. Next to the wheel on the axle is a cogged driver, 10, and pinion 11. This pinion is attached to a drum, 12, and gives motion to the same. On the surface of the drum are pins equally and properly spaced for the purpose of giving motion to a series of endless chains or bands, 13, at proper and certain intervals. On these chains or bands are attached claws, 14. These chains or bands revolve between the teeth of a comb, 15, over an apron, 16, and between guide-rods and over the cylinder. Inclosing this apron and comb are wings 17, projecting for the purpose of keeping the cotton-bolls confined for the revolving chains or bands to act upon. Over and a little to the rear is a revolving brush-cylinder, 18, receiving its motion from a cogged wheel, 19, and pinion 20, on the opposite side of first wheel and pinion. This brush-cylinder revolves in a contrary direction to the cylinder, which moves the chains with the claws. The object of this movement on the part of the brush-cylinder is to gather and to sweep the cotton-bolls to the rear in a box, 21, as they ascend on the claws of the chains or bands.

Attached to the side wings, and in advance of the points of the comb on each side, is a peculiarly-bent rod of metal. This is the divider 22, and is for the purpose of folding or bending the stalk to the action of the comb in such a manner as to give the greatest advantage to the operation of the machine.

The machine is furnished in the same manner as other agricultural machines, with a seat for the driver, 23. In front of the driver's seat is a bar; on top a wheel, 24; a ratchet-wheel and pawl, 25, beneath. Attached to this bar are two chains, 26 26', which chains are attached to a hinged frame, 27, which carries the comb and chains. The driver can, by turning the wheel at the top of this upright bar, raise or lower the comb at his will, in order to avoid obstruction, as the case may be, or to raise it well up from the ground when not in use.

A lever, 28, in connection with the small pinion, can, at the will of the driver, throw the same in or out of gear, thus starting or stopping the working of the machinery. Also attached to the end of this movable frame are upright guides 29, with pins for fixing and securing at the desired height for the working of the comb.

The method of operating the harvester is to transport to the field by a couple of horses hitched up in the usual manner, and drive it over the cotton-rows, the wheels being in gear, and as it moves forward the several parts are set in motion. The comb, coming in contact with the cotton-stalk, strips it of the bolls. These bolls are then caught up on the claws of the endless chains or bands, and are carried upward and over the top revolving cylinder. The revolving brush sweeps them off and backward into the rear box, which is to be emptied from time to time as the cotton accumulates in same. The driver, with wheel in front, raises or lowers the comb according to to the surface he goes over, and also with the side lever he can, at will, throw the machine in or out of gear.

The object of the divider is to bend in the stalks toward the comb as it passes along, and the side aprons keep the bolls well onto the revolving bands or chains.

The following is claimed as new:

1. The combination of the comb 15, with the endless chains or bands 13, provided with claws 14, and carried by a drum, 12, revolving on an axis transverse to the line of draft, as explained.

2. The combination of the dividers 22, wings 17, and comb 15, constructed and operating as and for the purposes described.

3. The combination of the comb 15, endless chains 13, and brush 18, substantially as and for the purposes set forth.

ALEXANDER LAWS HILL.
GEORGE WASHINGTON PAYNE.

Witnesses:
J. C. ALSUP,
H. F. SCHULZE.